United States Patent
Sugano

(10) Patent No.: US 7,322,320 B2
(45) Date of Patent: Jan. 29, 2008

(54) ENGINE CYLINDER BLOCK

(75) Inventor: Minoru Sugano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/203,972

(22) Filed: Aug. 16, 2005

(65) Prior Publication Data

US 2006/0037566 A1   Feb. 23, 2006

(30) Foreign Application Priority Data

Aug. 17, 2004  (JP) .............................. 2004-237616

(51) Int. Cl.
F02F 1/00 (2006.01)
(52) U.S. Cl. .............. 123/41.84; 123/41.72; 123/668
(58) Field of Classification Search ............. 123/41.84, 123/41.72, 41.67, 668
See application file for complete search history.

(56) References Cited

U.S. PATENT DOCUMENTS

| | | | |
|---|---|---|---|
| 4,172,435 A | | 10/1979 | Schumacher |
| 4,294,203 A | * | 10/1981 | Jones ..................... 123/195 R |
| 4,446,827 A | * | 5/1984 | Kubozuka ............... 123/195 R |
| 4,708,105 A | * | 11/1987 | Leydorf et al. .......... 123/193.3 |
| 5,056,470 A | * | 10/1991 | Wolters et al. .......... 123/41.84 |
| 5,537,969 A | * | 7/1996 | Hata et al. ............... 123/193.2 |
| 6,145,481 A | * | 11/2000 | Bock et al. .............. 123/41.79 |
| 6,328,001 B1 | * | 12/2001 | Kirtley et al. ........... 123/41.84 |
| 6,357,400 B1 | * | 3/2002 | Bedwell et al. .......... 123/41.84 |

2004/0079317 A1   4/2004   Koyama

FOREIGN PATENT DOCUMENTS

| | | |
|---|---|---|
| AT | 002 622 U1 | 1/1999 |
| GB | 949762 | 2/1964 |
| JP | 62-119450 | 7/1987 |
| JP | 2002-097997 | 4/2002 |
| WO | WO 2005/042957 | 5/2005 |

OTHER PUBLICATIONS

Chinese Language Version of Chinese Office Action for Appln. No. 200510090482.5 dated Jan. 5, 2007.
English Translation of Chinese Office Action for Appln. No. 200510090482.5 dated Jan. 5, 2007.
German Language Version of German Office Action for Application No. 10 2005 038 294.0-13 dated Nov. 27, 2006.
German Translation of German Office Action for Application No. 10 2005 038 294.0-13 dated Nov. 27, 2006.
Chinese Language Version of Chinese Office Action, Appln. No. 2005/10090482.5 dated Aug. 17, 2007.
English Translation of Chinese Office Action, Appln. No. 2005/10090482.5 dated Aug. 17, 2007.

* cited by examiner

*Primary Examiner*—Stephen K. Cronin
*Assistant Examiner*—Jason Benton
(74) *Attorney, Agent, or Firm*—Kenyon & Kenyon LLP

(57) ABSTRACT

A cylinder block including a block with two parts, a cylinder liner portion defining an inner wall of a water jacket and a cylinder block body defining an outer wall of the water jacket. The water jacket, which extends around the cylinders, is defined between the cylinder liner portion and the cylinder block body. A cylinder connector includes rectangular partition walls arranged in the direction cylinder liners are aligned. Each partition wall partitions adjacent cylinder lines and extends vertically downward from the bottom of the cylinder connector.

13 Claims, 5 Drawing Sheets

ENGINE CYLINDER BLOCK

BACKGROUND OF THE INVENTION

The present invention relates to an engine cylinder block.

A typical cylinder block for an engine has an upper part including cylinders and a lower part functioning as a crankcase. Japanese Laid-Open Patent Publication No. 2002-97997 describes a cylinder block formed from two parts, a cylinder liner portion and a cylinder block body. The cylinder liner portion forms cylinders, and the cylinder block body forms a crankcase and the outer walls of a water jacket. The water jacket is defined between the cylinder liner portion and the cylinder block body. The cylinder liner portion connects the peripheral surfaces of a plurality of cylindrical cylinder liners.

In a cylinder liner portion of such a two-part cylinder block, the walls defining cylinders may be integrally formed with an upper deck, which receives a cylinder head and which is fastened to the cylinder block body. With a two-part cylinder block having such a structure, the upper section of the cylinder liner portion is securely fastened to the cylinder block body.

However, in comparison with the upper section, the lower section of the cylinder liner portion has less rigidity. As a result, the thermal expansion and vibrations that occur during the combustion of air-fuel mixture may lead to thermal distortion or deformation. Such deformation or distortion may increase the slide resistance of pistons and affect engine performance in an undesirable manner.

SUMMARY OF THE INVENTION

It is an object of the present invention to provide a two-part engine cylinder block that minimizes deformation of cylinder bores.

One aspect of the present invention is a cylinder block for mounting a cylinder head thereon. The cylinder block is provided with a block in which a plurality of cylinders are formed. A water jacket is formed around the plurality of cylinders. The block includes a cylinder liner portion including the cylinders and defining an inner wall of the water jacket. A cylinder block body defines an outer wall of the water jacket. The cylinder block body has a top surface. An upper deck is formed integrally with the cylinder liner portion and supported by the top surface of the cylinder block body, with the cylinder head being mountable on the upper deck. A partition wall is formed in the cylinder liner portion for partitioning a pair of adjacent ones of the cylinders. The partition wall extends downward from the cylinder liner portion.

Another aspect of the present invention is an engine including a cylinder block, a plurality of cylinders, a water jacket formed around the cylinders, a cylinder head mounted on the cylinder block, and a crankshaft rotatably supported by the cylinder block. The cylinder block is provided with a cylinder liner portion including the cylinders and defining an inner wall of the water jacket. A cylinder block body defines an outer wall of the water jacket. The cylinder block body has a top surface. An upper deck is formed integrally with the cylinder liner portion and supported by the top surface of the cylinder block body. The cylinder head is mounted on the upper deck. A partition wall is formed in the cylinder liner portion for partitioning a pair of adjacent ones of the cylinders. The partition wall extends downward from the cylinder liner portion. The partition wall supports the crankshaft with the cylinder block body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A cylinder block 3 for an in-line, four cylinder, water-cooled engine according to a preferred embodiment of the present invention will now be described with reference to FIGS. 1 to 8.

Figure 1:
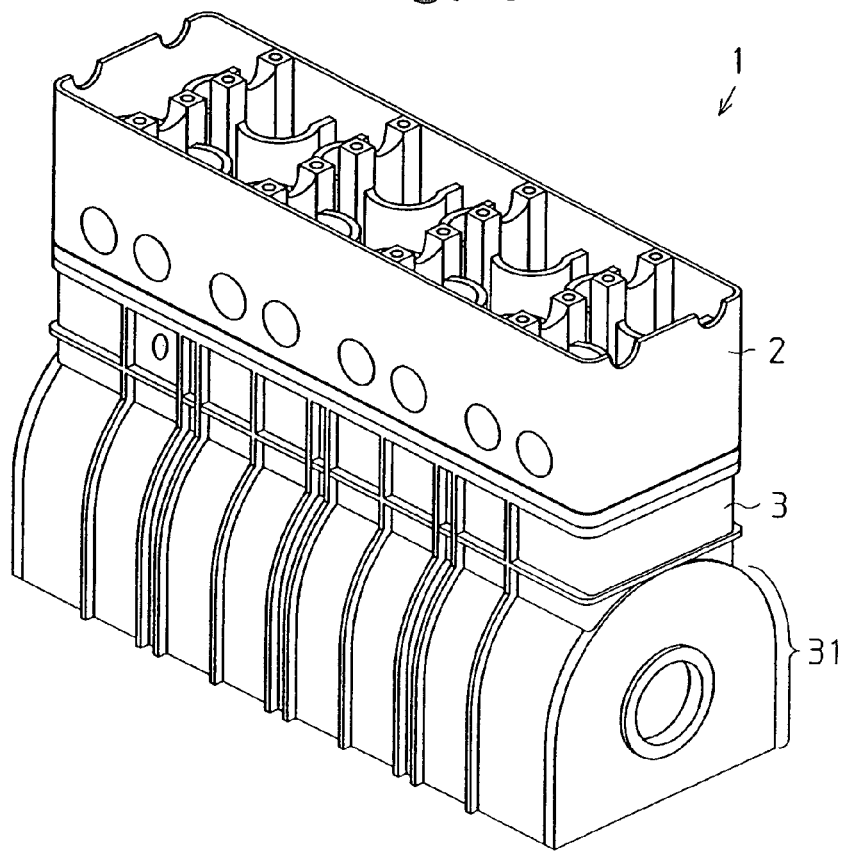
FIG. 1 is a perspective view showing a water-cooled engine according to a preferred embodiment of the present invention.

As shown in FIG. 1, an engine 1 includes a cylinder head 2 and a cylinder block 3. A head cover (not shown) is mounted on the cylinder head 2, and an oil pan (not shown) is located below the cylinder block 3.

Figure 2:
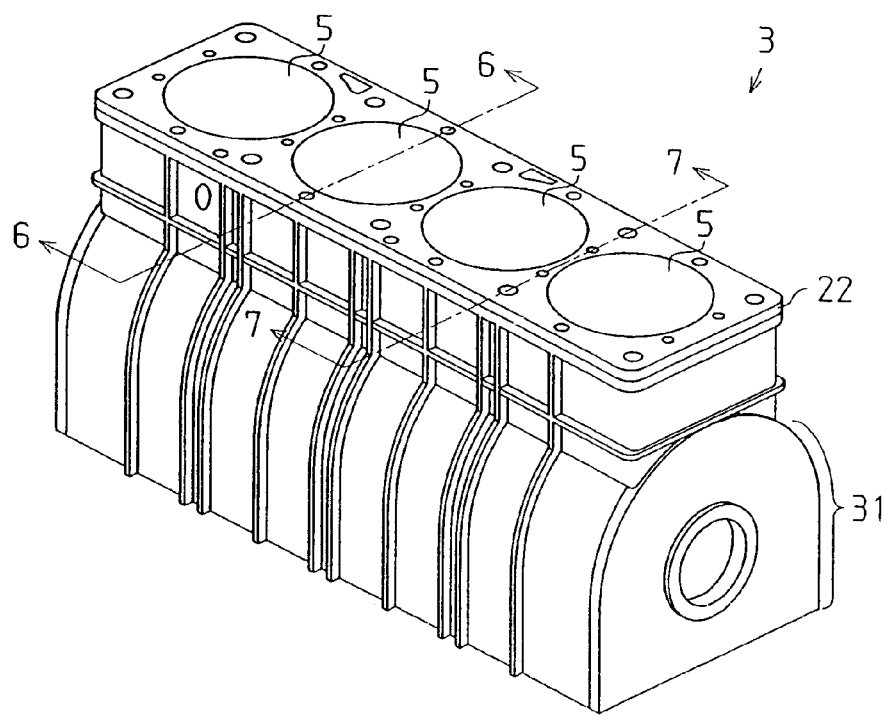
FIG. 2 is a perspective view showing a cylinder block of the engine of FIG. 1.

FIG. 2 shows the cylinder block 3. As shown in the drawing, the cylinder block 3 includes an upper portion provided with four cylinders 5 and a lower portion provided with a crankcase 31. The crankcase 31 includes the oil pan. A plate-shaped upper deck 22 is arranged on the top of the cylinder block 3. The upper deck 22 receives the lower surface of the cylinder head 2.

Figure 3:
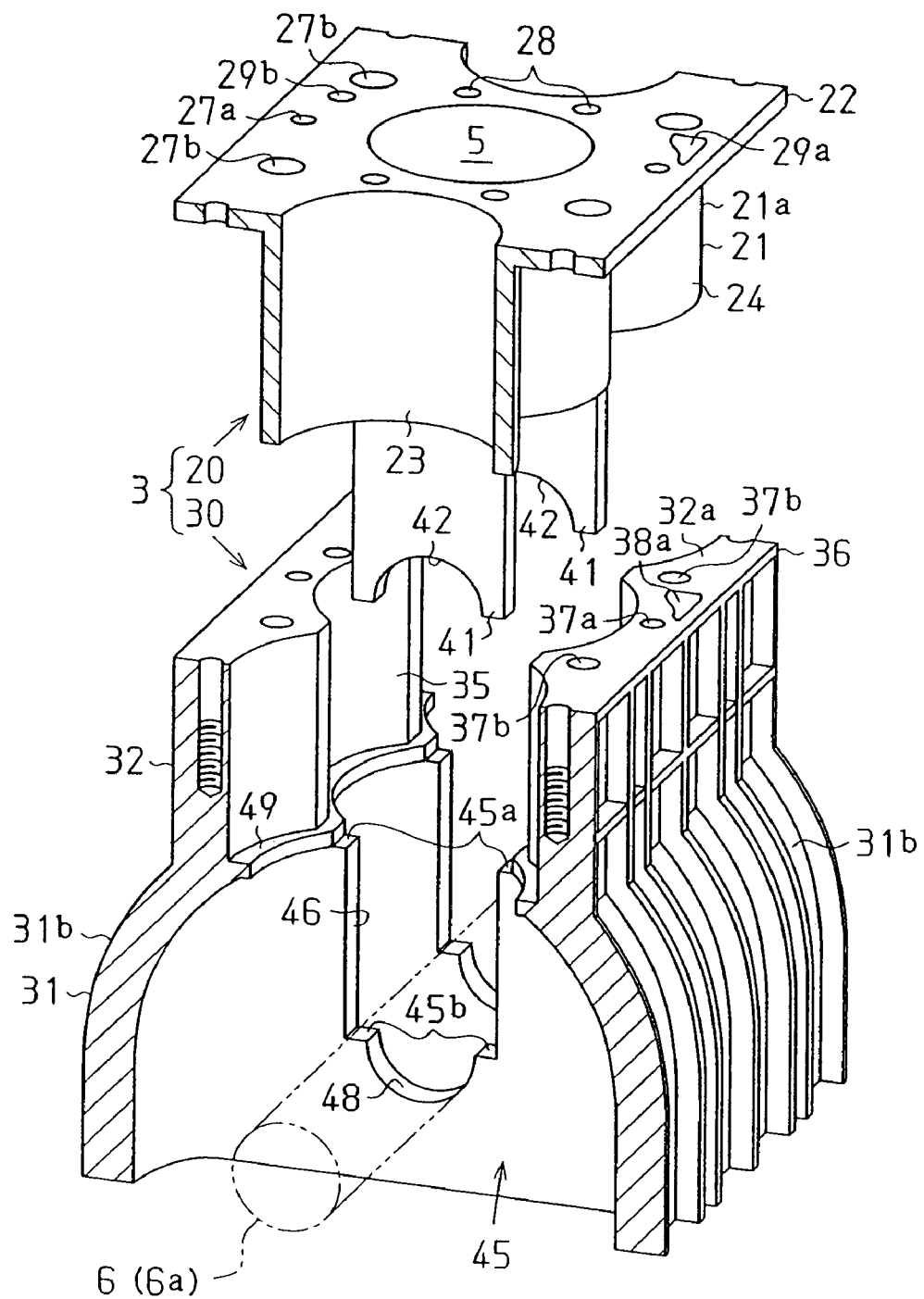
FIG. 3 is an exploded perspective view of the cylinder block.

Referring to FIG. 3, the cylinder block 3 is formed from two parts, a cylinder liner portion 20 and a cylinder block body 30. The cylinder liner portion 20 forms the inner walls of a water jacket, and the cylinder block body 30 forms the outer walls of the water jacket. Thus, the water jacket, which extends around the cylinders 5, is defined between the cylinder liner portion 20 and the cylinder block body 30. In other words, in the cylinder block 3, the outer surface of the cylinder liner portion 20 defines the inner wall surface of the water jacket, and the inner surface of the cylinder block body 30 defines the outer wall surface of the water jacket.

Figure 4:
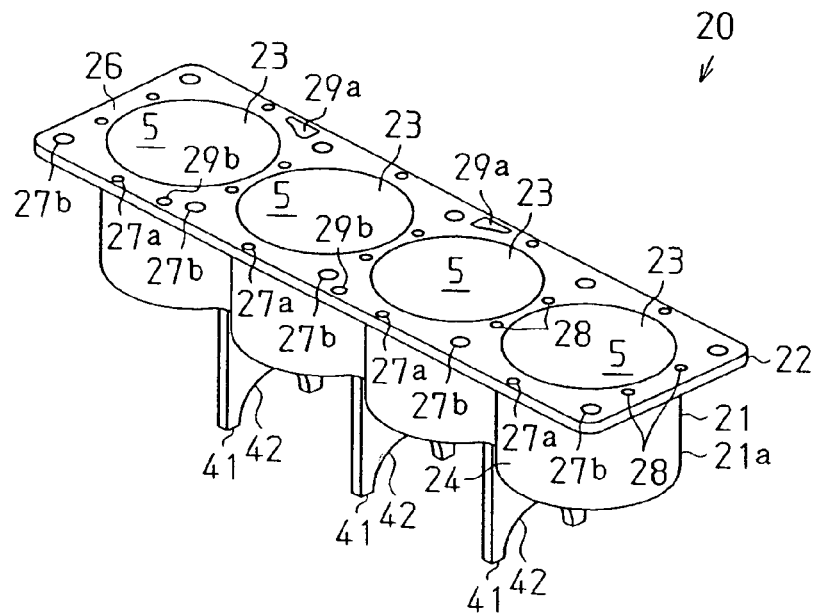
FIG. 4 is a perspective view showing a cylinder liner portion of the cylinder block.

Referring to FIGS. 3 and 4, the cylinder liner portion 20 includes a cylinder connector 21 integrally connecting four cylinder liners 21a, the upper deck 22 formed above the cylinder connector 21, and three partition walls 41 extending downward from the cylinder connector 21. The cylinder connector 21, the upper deck 22, and the partition walls 41 are integrally formed with each other. The cylinder liner portion 20 is made of, for example, an aluminum alloy or a magnesium alloy, and cast by performing, for example, die casting. The cylinder connector 21 integrally connects the peripheral surfaces of the cylinder liners 21a, each defining a cylinder 5, with the cylinder liners 21a being aligned along a straight line. A protection film of, for example, steel is sprayed onto the inner surface 23 of each cylinder 5, in which a piston reciprocates.

The upper deck 22, which defines the top surface of the cylinder block 3, is integrally formed with the top part of the cylinder connector 21. The upper deck 22 is plate-shaped and receives the cylinder head 2 (refer to FIG. 1). Bolt insertion holes 27a, which are used to fasten the cylinder liner portion 20 and the cylinder block body 30, and bolt insertion holes 27b, which are used to fasten the cylinder head 2 and the cylinder block 3, extend through the upper deck 22. Further, a plurality of holes, such as coolant holes 28, oil holes 29a, and blow-by gas holes 29b are formed in the upper deck 22.

The three partition walls 41, which are generally rectangular, extend vertically downward from the bottom of the cylinder connector 21 and are arranged in the direction the cylinder liners 21a are aligned. Each partition wall 41 is located between two adjacent cylinder liners 21a so as to partition the adjacent cylinder liners 21a. The bottom middle part of each partition wall 41 defines a semicircular first cutaway portion 42. When the cylinder liner portion 20 and the cylinder block body 30 are attached to each other, the first cutaway portion 42 functions as part of a bearing 55 for rotatably supporting the crankshaft 6 (refer to FIGS. 6 and 7).

Figure 5:
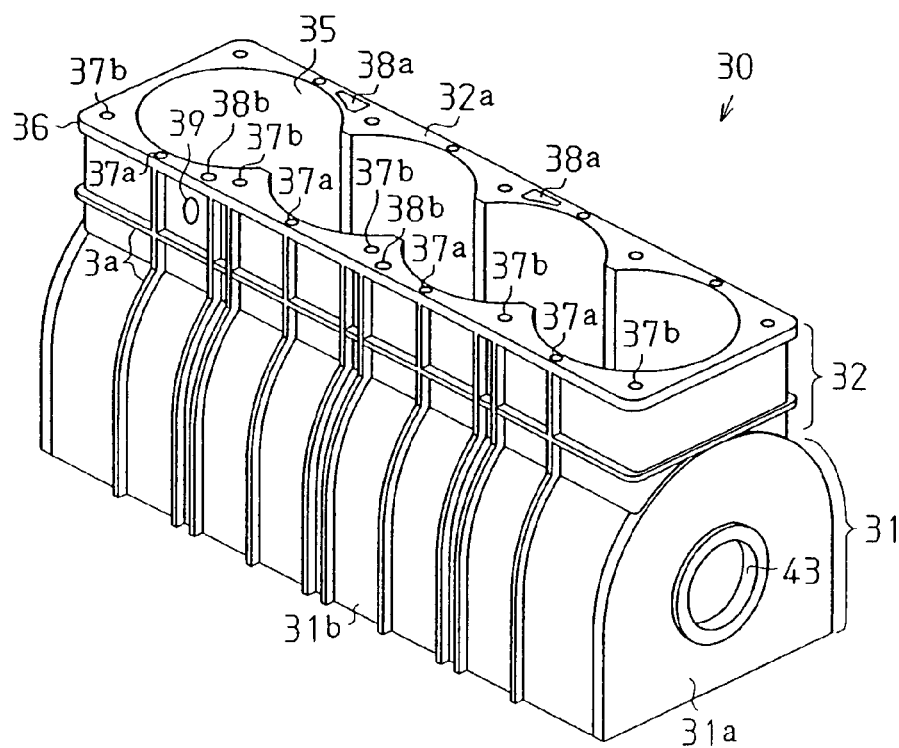
FIG. 5 is a perspective view showing a cylinder block body of the cylinder block.

Referring to FIGS. 3 and 5, the cylinder block body 30 includes the crankcase 31 and a cylinder outer wall portion 32, which surrounds the periphery of the cylinder connector 21. The crankcase 31 and the cylinder outer wall portion 32 are formed integrally with each other. In the same manner as the cylinder liner portion 20, the cylinder block body 30 is made of, for example, an aluminum alloy or a magnesium alloy, and cast by performing, for example, die casting. The cylinder outer wall portion 32 extends upward from the crankcase 31. A plurality of reinforcement ribs 3a extend along the peripheral surface of the cylinder outer wall portion 32 in vertical and horizontal directions.

The inner surface 35 of the cylinder outer wall portion 32 is formed so as to extend around an outer surface 24 of the cylinder connector 21 of the cylinder liner portion 20. A coolant port 39, which is connected to the water jacket, is formed in the side of the cylinder outer wall portion 32. Coolant flows into and out of the coolant port 39. A flange 36 extends along the top of the cylinder outer wall portion 32. The flange 36 has an upper surface that defines an upper seat surface 32a for supporting the upper deck 22.

The upper seat surface 32a includes bolt fastening holes 37a, for fastening the cylinder liner portion 20 and the cylinder block body 30, and bolt fastening holes 37b, for fastening the cylinder head 2 and the cylinder block 3. Further, an oil passage 38a, through which oil is returned from the cylinder head 2 to the oil pan, and a blow-by gas passage 38b, through which blow-by gas flows, extends through the cylinder outer wall portion 32. The passages 38a and 38b open in the upper seat surface 32a of the cylinder outer wall portion 32. The openings of the bolt fastening holes 37a and 37b, the oil passage 38a, and the blow-by gas passage 38b are aligned with the bolt insertion holes 27a and 27b, the oil hole 29a, and the blow-by gas hole 29b, which are formed in the upper deck 22.

Two removable side walls 31a are arranged on the longitudinal ends of the crankcase 31. An insertion hole 43 is formed in the central portion of each side wall 31a. The insertion holes 43 function as bearings for rotatably supporting end portions of a crankshaft 6.

A support projection 49 extends from the inner surface 35 of the cylinder outer wall portion 32 in the crankcase 31. The support projection 49 supports the outer surface 24 of the cylinder connector 21 of the cylinder liner portion 20 from the outer side. Further, the support projection 49 extends along the inner surface 35 of the cylinder outer wall portion 32.

Support members, or support plates 45, are arranged in the crankcase 31 in correspondence with the partition walls 41 extending from the bottom of the cylinder connector 21. The support plates 45 are formed integrally with the cylinder block body 30 and support the lower part of the cylinder liner portion 20 from the lower side. Further, the support plates 45 serve as wall members that connect side walls 31b of the crankcase 31. A support slot 46 shaped in correspondence with the associated partition wall 41 is formed in the middle portion of each support plate 45. Each partition wall 41 of the cylinder connector 21 is engaged with the support slot 46 of the corresponding support plate 45.

The bottom middle part of each support slot 46 defines a semicircular second cutaway portion 48. When the cylinder liner portion 20 and the cylinder block body 30 are attached to each other, the second cutaway portion 48 functions as part of the bearing 55 for rotatably supporting the crankshaft 6 (refer to FIGS. 6 and 7).

Figure 6:
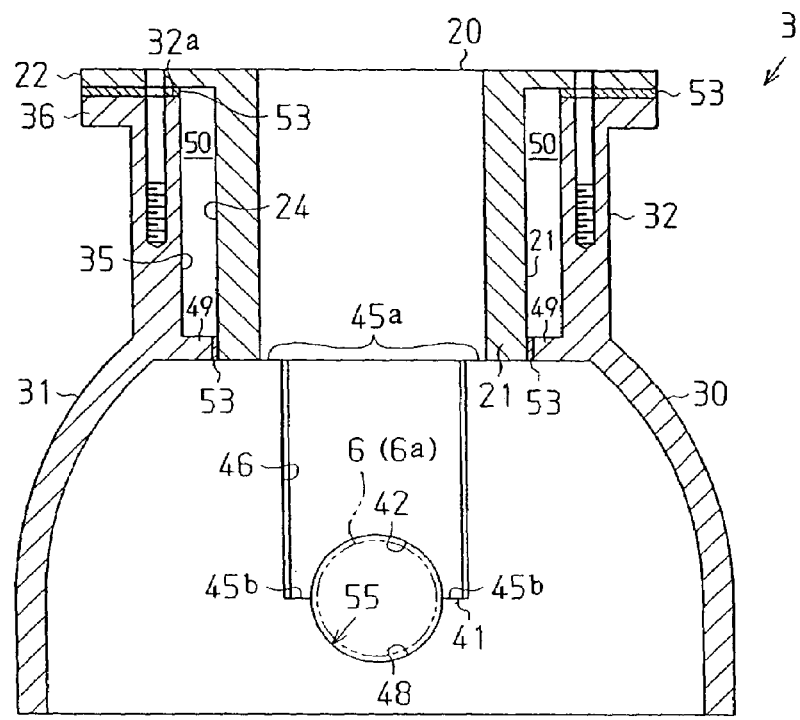
FIG. 6 is a cross-sectional view taken along line 6-6 in FIG. 2.
Figure 7:
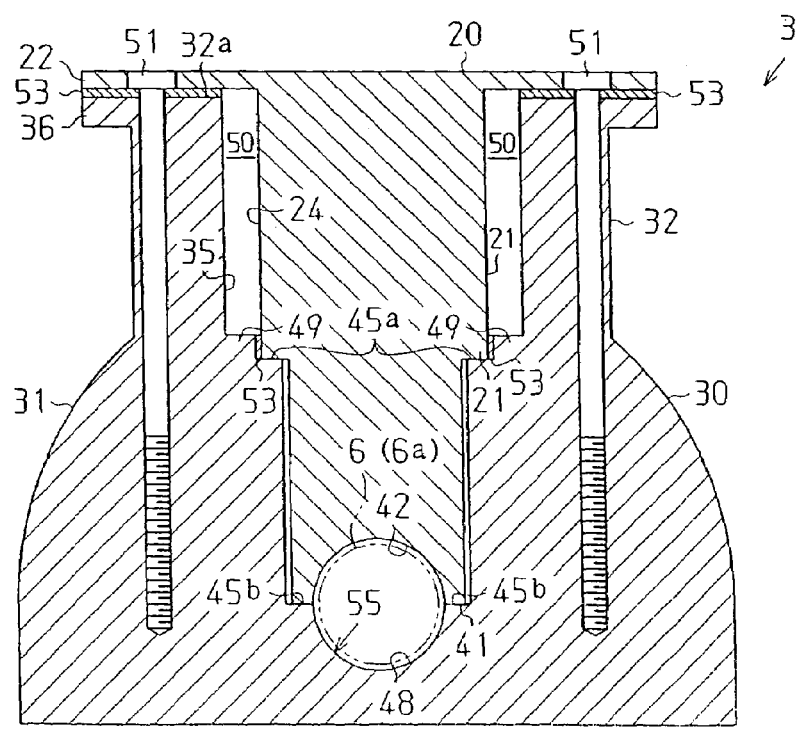
FIG. 7 is a cross-sectional view taken along line 7-7 in FIG. 2.

Referring to FIGS. 6 and 7, the cylinder liner portion 20 is attached to the cylinder block body 30 in a state in which the cylinder connector 21 is inserted in the cylinder outer wall portion 32. The cylinder connector 21 is inserted into the cylinder outer wall portion 32 until the upper seat surface 32a of the cylinder outer wall portion 32 comes into contact with the lower surface of the upper deck 22. In this state, a gap defining a water jacket 50 is formed between the cylinder outer wall portion 32 and the cylinder connector 21. The water jacket 50 is connected to the coolant holes 28 formed in the upper deck 22 (refer to FIG. 4).

In the upper part of the cylinder liner portion 20, head bolts 51 fasten the upper deck 22 to the upper seat surface 32a of the cylinder outer wall portion 32. In the middle part of the cylinder liner portion 20, the outer surface 24 of the cylinder connector 21 is supported by a distal surface of the support projection 49 extending from the cylinder outer wall portion 32. Thus, the upper and lower end portions of the cylinder connector 21 are stably supported by the upper seat surface 32a of the cylinder outer wall portion 32 and the distal surface of the support projection 49.

A seal 53 is arranged between the lower surface of the upper deck 22 and the upper seat surface 32a of the cylinder outer wall portion 32 and between the outer surface 24 of the cylinder connector 21 and the distal surface of the support projection 49. This hermetically seals the upper and lower parts of the water jacket 50 and prevents coolant from leaking out of the water jacket 50.

Each partition wall 41 extends downward from the bottom of the cylinder connector 21 and engages with the support slot 46 of the corresponding support plate 45 in the lower part of the cylinder liner portion 20. In this engaged state, the lower end surface of the cylinder connector 21 is forced against an upper end surface 45a of the support plate 45, and the lower end surface of the downwardly extending partition wall 41 is forced against the bottom surface 45b of the support slot 46. In this manner, the support plates 45 of the cylinder block body 30 supports the lower part of the cylinder liner portion 20.

The first cutaway portion 42 of each partition wall 41 and the second cutaway portion 48 of the corresponding support slot 46 define the bearing 55, which rotatably supports the crankshaft 6, in the vicinity of the location where the lower end surface of the partition wall 41 contacts the bottom surface 45b of the support slot 46. The bearings 55 formed in this manner support crank journals 6a of the crankshaft 6.

Figure 8:
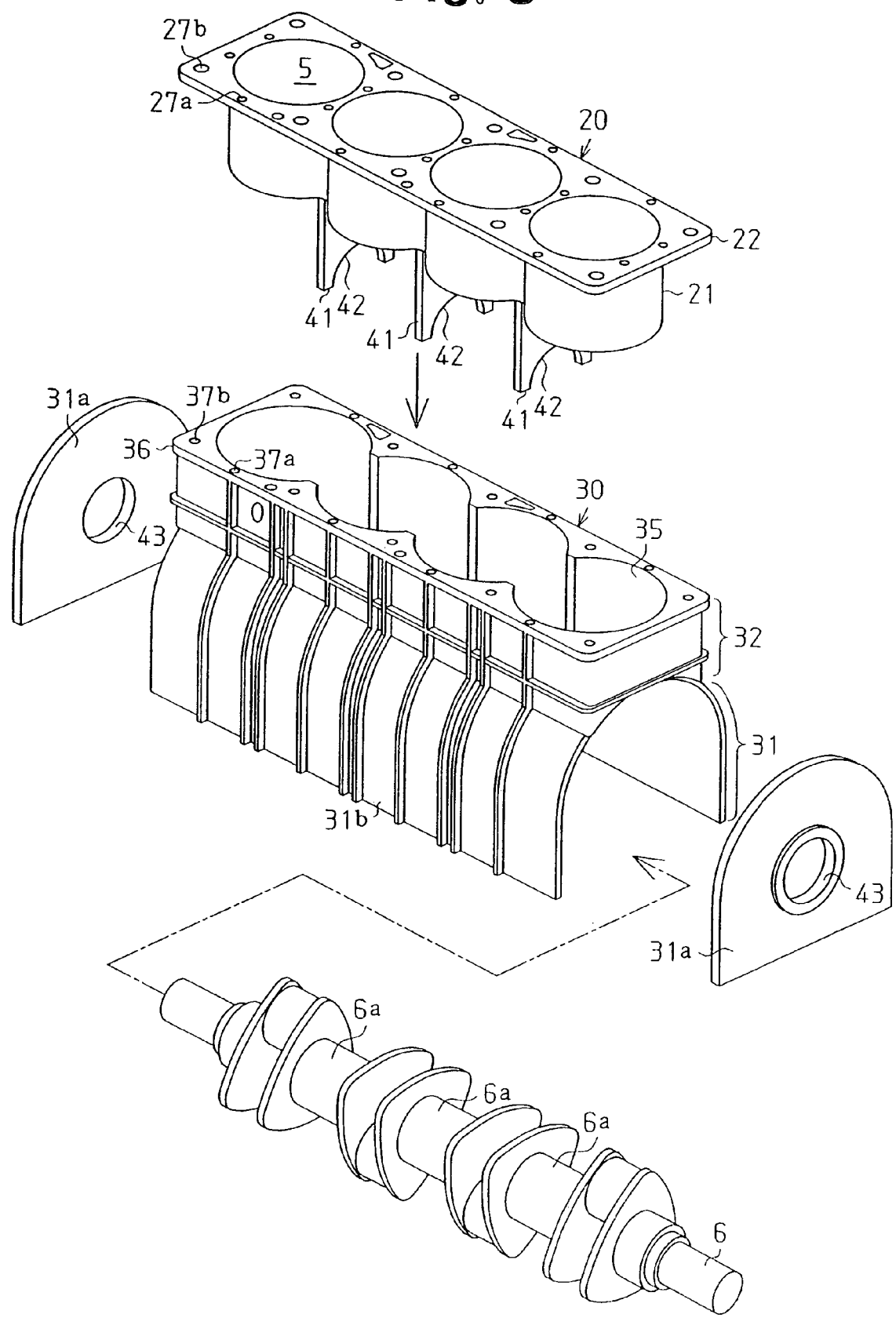
FIG. 8 is a schematic diagram showing the procedure for installing a crankshaft in the cylinder block.

The procedures for assembling the cylinder block 3 with the cylinder block 3 and the crankshaft 6 will now be discussed with reference to FIGS. 3 and 8.

First, the crankshaft 6 is inserted into the cylinder block body 30 through any one of openings formed in the longitudinal ends of the crankcase 31. Then, the crank journals 6a are fitted to the second cutaway portions 48 of the support plates 45 in the crankcase 31 to arrange the crankshaft 6 at a predetermined position.

The cylinder liner portion 20 is then attached to the cylinder block body 30 from the upper side. The cylinder connector 21 is inserted along the inner surface 35 into the cylinder outer wall portion 32 until the upper deck 22 of the cylinder liner portion 20 comes into contact with the flange 36 of the cylinder outer wall portion 32. This engages the partition walls 41 of the cylinder connector 21 with the support slots 46 of the support plates 45 so that the lower part of the cylinder liner portion 20 is supported by the support plates 45 from below.

In this state, the lower end surface of each partition wall 41 is abut against the bottom surface 45b of the corresponding support slot 46 so that the crank journals 6a of the crankshaft 6 are held from both upper and lower directions. This forms the bearing 55, which rotatably supports the crankshaft 6, with the first cutaway portion 42 and the second cutaway portion 48 in the vicinity of the location where the lower end surface of the partition wall 41 contacts the bottom surface 45b of the support slot 46.

Subsequently, the side walls 31a are attached to the crankcase 31 at the openings. The end portions of the crankshaft 6 are extended through the insertion holes 43 when attaching the side walls 31a to the crankcase 31. This closes the openings and rotatably supports the two end portions of the crankshaft 6.

Finally, the head bolts 51 are inserted into the bolt insertion holes 27a of the upper deck 22 and the bolt fastening holes 37a of the cylinder outer wall portion 32 (refer to FIG. 7) to fasten the cylinder liner portion 20 to the cylinder block body 30. This forces the lower end surface of the cylinder connector 21 against the upper end surface 45a of each support plate 45, and the lower end surface of each partition wall 41 against the bottom surface 45b of the corresponding support slot 46. In this manner, the support plates 45 of the cylinder block body 30 supports the lower part of the cylinder liner portion 20. Further, the bearings 55 rotatably support the crankshaft 6 at the predetermined position. In this manner, the crankshaft 6 is installed in the cylinder block 3 when attaching the cylinder liner portion 20 to the cylinder block body 30 to assemble the cylinder block 3.

The preferred embodiment has the advantages described below.

(1) Each partition wall 41 extending from the bottom of the cylinder connector 21 is arranged to partition adjacent cylinder liners 21a. This prevents vibrations generated in each cylinder from being transmitted to the adjacent cylinder. Further, the partition walls 41 prevent resonance that would be caused by such vibrations. Additionally, the partition walls 41 increase the thermal capacity at the lower part of the cylinder liner portion 20 and prevents deformation that would be caused by heat. This prevents distortion or deformation of the cylinder bores in the cylinder block 3 that would be caused by thermal expansion or vibrations resulting from combustion of the air-fuel mixture. Thus, changes in the bore diameter of the cylinder block 3 are prevented, the bore roundness is kept satisfactory, and the performance of the engine 1 is maintained at a satisfactory level.

(2) In the crankcase 31, the support plates 45 extend in correspondence with the partition walls 41 extending downward from the lower part of the cylinder connector 21. The cylinder block body 30 supports the lower end portions of the partition walls 41. This prevents the lower end portions of the partition walls 41 from vibrating even if the partition walls 41 are thin. Further, vibrations generated in each cylinder are prevented from being transmitted to the adjacent cylinder. This prevents resonance that would be caused by such vibrations.

(3) The support slot 46 formed in the middle portion of each support plate 45 is shaped in correspondence with the associated partition wall 41 of the cylinder liner portion 20. Thus, each partition wall 41 extending downward from the lower part of the cylinder connector 21 is engaged with the support slot 46 of the corresponding support plate 45 in a state in which the lower end surface of the cylinder connector 21 is forced against an upper end surface 45a of the support plate 45, and the lower end surface of the partition wall 41 is forced against the bottom surface 45b of the support slot 46. Thus, the upper part of the cylinder liner portion 20 is securely supported by the upper deck 22, and the lower part of the cylinder liner portion 20 is supported by the support plates 45 from below. Accordingly, the cylinder liner portion 20 is kept attached to the cylinder block body 30 in a satisfactory state.

(4) The semicircular first cutaway portion 42 is formed in the bottom part of each partition wall 41 and the semicircular second cutaway portion 48 is formed in the bottom surface 45b of each support plate 45. The attachment of the cylinder liner portion 20 to the cylinder block body 30 forms the bearing 55 for rotatably supporting the crankshaft 6 with the first and second cutaway portions 42 and 48 in the vicinity of the location where the lower end surface of each partition wall 41 contacts the bottom surface 45b of the corresponding support plate 45. The partition walls 41 and the support plates 45 that form the bearings 55 are respectively formed integrally with the cylinder liner portion 20 and the cylinder block body 30, which form the two parts of the cylinder block 3. Since the entire cylinder block 3 receives the load applied to the crankshaft 6, the bearing structure for supporting the crankshaft 6 has high rigidity.

Further, the attachment of the cylinder liner portion 20 to the cylinder block body 30 when assembling the cylinder block 3 forms the bearings 55, which rotatably support the crankshaft 6, in the crankcase 31. Thus, in comparison to when using exclusive components to install the crankshaft 6 to the cylinder block 3, the installation of the crankshaft 6 is facilitated and there is no need to carry out complicated work. This improves workability when assembling the engine.

(5) The insertion holes 43 for rotatably supporting the end portions of the crankshaft 6 are formed in the two side walls 31a at the longitudinal ends of the crankcase 31. Thus, the entire cylinder block 3 receives the load applied to the two end portions of the crankshaft 6. Accordingly, the crankshaft 6 is stably supported, and the bearing structure supporting the crankshaft 6 has further increased rigidity.

It should be apparent to those skilled in the art that the present invention may be embodied in many other specific forms without departing from the spirit or scope of the invention. Particularly, it should be understood that the present invention may be embodied in the following forms.

The first cutaway portion 42, which is arranged in each partition wall 41 that is between adjacent cylinder liners 21*a*, and the second cutaway portion 48, which is arranged in the support slot 46 of each support plate 45, may be eliminated, and the crankshaft 6 may rotatably be supported between the crankcase 31 and the oil pan.

Additional partition walls 41 may be arranged in the cylinder liner portion 20 at the end portions of the aligned cylinder liners 21*a* so that there are four or five partition walls 41.

For example, the internal structure of the crankcase 31 may be changed so that there are only one or two partition walls 41 extending from the lower part of the cylinder connector 21.

The side walls 31*a* arranged at the two longitudinal ends of the crankcase 31 may be eliminated. In this case, the crankshaft 6 may rotatably be supported by only the bearings 55 formed by the first cutaway portions 42 of the partition walls 41 and the second cutaway portions 48 of the support plates 45.

The bolt insertion holes 27*a* for fastening the cylinder liner portion 20 and the cylinder block body 30 may be commonly used with the bolt insertion holes 27*b* for fastening the cylinder head 2 and the cylinder block 3. In the same manner, the bolt fastening holes 37*a* for fastening the cylinder liner portion 20 and the cylinder block body 30 may be commonly used with the bolt fastening holes 37*b* for fastening the cylinder head 2 and the cylinder block 3.

Instead of the cylinder block 3 for an in-line, four cylinder, water-cooled engine, the present invention may be applied to a cylinder block for an engine with any number of cylinders.

The present examples and embodiments are to be considered as illustrative and not restrictive, and the invention is not to be limited to the details given herein, but may be modified within the scope and equivalence of the appended claims.

The invention claimed is:

1. A cylinder block for mounting a cylinder head thereon, the cylinder block comprising:
    a block in which a plurality of cylinders are formed;
    a water jacket formed around the plurality of cylinders, the block including:
    a cylinder liner portion including the cylinders and defining an inner wall of the water jacket;
    a cylinder block body defining an outer wall of the water jacket, the cylinder block body having a top surface;
    an upper decks formed integrally with the cylinder liner portion and supported by the top surface of the cylinder block body, with the cylinder head being mountable on the upper deck;
    a partition wall formed in the cylinder liner portion for partitioning a pair of adjacent ones of the cylinders, the partition wall extending downward from the cylinder liner portion, and
    a support member for supporting the partition wall in the cylinder block body from below, the support member is integrally formed with the cylinder block body, wherein a crankshaft is rotatably supportable from the support member and the lower end portion of the partition wall.

2. The cylinder block according to claim 1, wherein the partition wall has a lower end portion supported by the support member.

3. The cylinder block according to claim 1, further comprising:
    a crankcase formed integrally with the cylinder block body and having two side walls, the side walls including insertion holes for rotatably supporting the crankshaft.

4. The cylinder block according to claim 1, wherein the partition wall and the support member each include a semicircular cutaway portion that forms a bearing for the crankshaft.

5. The cylinder block according to claim 3, wherein the partition wall and the support member each include a semicircular cutaway portion that forms a bearing for the crankshaft.

6. The cylinder block according to claim 1, wherein the support member includes a support slot shaped substantially in correspondence with the partition wall, the partition wall being received in the support slot.

7. An engine comprising:
    a cylinder block;
    a plurality of cylinders;
    a water jacket formed around the cylinders;
    a cylinder head mounted on the cylinder block; and
    a crankshaft rotatably supported by the cylinder block, the cylinder block including:
    a cylinder liner portion including the cylinders and defining an inner wall of the water jacket;
    a cylinder block body defining an outer wall of the water jacket, the cylinder block body having a top surface;
    an upper deck formed integrally with the cylinder liner portion and supported by the top surface of the cylinder block body, the cylinder head being mounted on the upper deck;
    a partition wall formed in the cylinder liner portion for partitioning a pair of adjacent ones of the cylinders, the partition wall extending downward from the cylinder liner portion, and
    a support member for supporting the partition wall in the cylinder block body from below, the support member is integrally formed with the cylinder block body, wherein the partition wall supporting the crankshaft with the support member.

8. The engine according to claim 7, wherein the partition wall has a lower end portion supported by the support member.

9. The engine according to claim 8, wherein the crankshaft is rotatably supported by the lower end portion of the partition wall and the support member.

10. The engine according to claim 9, further comprising:
    a crankcase formed integrally with the cylinder block body and having two side walls, the side walls including insertion holes for rotatably supporting the crankshaft.

11. The engine according to claim 9, wherein the partition wall and the support member each include a semicircular cutaway portion that forms a bearing for the crankshaft.

12. The engine according to claim 10, wherein the partition wall and the support member each include a semicircular cutaway portion that forms a bearing for the crankshaft.

13. The engine according to claim 7, wherein the support member includes a support slot shaped substantially in correspondence with the partition wall, the partition wall being received in the support slot.

* * * * *